(12) United States Patent
Donoho

(10) Patent No.: US 8,869,467 B2
(45) Date of Patent: *Oct. 28, 2014

(54) BIRD SPIKE WITH PLASTIC BASE

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,195

(22) Filed: Sep. 4, 2013

(65) Prior Publication Data

US 2014/0007524 A1  Jan. 9, 2014

Related U.S. Application Data

(63) Continuation of application No. 13/460,593, filed on Apr. 30, 2012, now Pat. No. 8,601,747.

(60) Provisional application No. 61/595,440, filed on Feb. 6, 2012.

(51) Int. Cl.
E04B 1/72 (2006.01)
A01M 29/32 (2011.01)

(52) U.S. Cl.
CPC . *A01M 29/32* (2013.01); *E04B 1/72* (2013.01)
USPC .................................. 52/101; 52/79.1; 43/1

(58) Field of Classification Search
USPC .......... 52/24, 26, 5, 100, 101; 43/1; 119/52.3, 119/57.9, 713, 903; 256/11; 6/24, 26, 5, 6/100, 101
See application file for complete search history.

(56) References Cited

U.S. PATENT DOCUMENTS

| 2,888,716 | A | 6/1959 | Kaufmann |
| 3,282,000 | A | 11/1966 | Shaw et al. |
| 5,253,444 | A | 10/1993 | Donoho et al. |
| 5,433,029 | A | 7/1995 | Donoho et al. |
| 6,250,023 | B1 | 6/2001 | Donoho |

(Continued)

FOREIGN PATENT DOCUMENTS

| DE | 202007013279 U1 | 12/2007 |
| EP | 0300936 | 7/1988 |

(Continued)

*Primary Examiner* — Brian Glessner
*Assistant Examiner* — Beth Stephan
(74) *Attorney, Agent, or Firm* — Fish & Tsang LLP

(57) ABSTRACT

A deterrent device can include an elongated base having upper and lower raised portions and a plurality of spikes coupled thereto. The spikes can each be configured to extend from the base such that such that the spikes alternate on each side of the base between a lower-angled spike and an upper-angled spike. The base can further include first and second wings that each has a width that is at least twice a width of the base.

19 Claims, 8 Drawing Sheets

(56) References Cited

U.S. PATENT DOCUMENTS

| | | |
|---|---|---|
| 6,457,283 B1 | 10/2002 | Jensen |
| 6,546,676 B2 | 4/2003 | Wiesener et al. |
| 6,718,701 B2 | 4/2004 | Riddell |
| 6,775,950 B2 | 8/2004 | Donoho |
| 7,040,058 B2 | 5/2006 | Finkelstein |
| 7,243,465 B2 | 7/2007 | Donoho |
| 7,596,910 B1 | 10/2009 | Donoho |
| 7,802,405 B1 | 9/2010 | Donoho et al. |
| 2001/0017012 A1 | 8/2001 | Wiesener et al. |
| 2003/0172575 A1 | 9/2003 | Donoho |
| 2003/0208967 A1 | 11/2003 | Riddell |
| 2004/0216393 A1 | 11/2004 | Hall et al. |
| 2005/0160685 A1 | 7/2005 | Donoho |
| 2007/0180781 A1 | 8/2007 | Donoho |
| 2009/0249710 A1 | 10/2009 | Donoho |
| 2010/0013123 A1 | 1/2010 | Donoho |
| 2011/0214618 A1 | 9/2011 | Donoho |

FOREIGN PATENT DOCUMENTS

| | | |
|---|---|---|
| EP | 0340108 | 4/1989 |
| EP | 1675456 | 2/2012 |
| FR | 2693080 | 1/1994 |
| FR | 2730383 | 6/1996 |
| GB | 2344269 | 8/2003 |
| GB | 2359240 | 5/2004 |
| GB | 2400010 | 2/2006 |
| GB | 2402861 | 2/2006 |
| GB | 2432412 | 10/2009 |
| JP | 2006-75036 | 3/2006 |
| WO | 2005/029955 | 4/2005 |

…

BIRD SPIKE WITH PLASTIC BASE

This application is a continuation of U.S. Utility application Ser. No. 13/460593 filed on Apr. 30, 2012, which claims priority to U.S. Provisional Application No. 61/595,440 filed on Feb. 6, 2012. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is animal deterrents, and especially as they relate to bird deterrents.

BACKGROUND

The presence of birds on window sills, roof tops, boat masts, and other surfaces is often undesirable. Among other things, birds tend to be noisy and make an unsightly mess that can attract insects and provide a fertile bed for bacteria which can present a significant health hazard. Additionally, the unaesthetic appearance of bird droppings and the like often requires unpleasant and time consuming clean up where access to the droppings is available. Often, the repulsive appearance of bird droppings and other by-products of birds are not even accessible for clean up.

It is known to mount a plurality of pointed objects, such as spikes and the like, on surfaces where it is desired to repel birds. See, e.g, U.S. Pat. Appl. 2004/0216393 to Hall, et al. (publ. November 2004), and UK Patent No. 2432412B to Jones. However, traditional bird repellent devices comprise a metal base with a plurality of angularly and upwardly projecting metal wires or spikes. Unfortunately, such metal contraptions, while accomplishing the desired result, tend to be costly to manufacture because they are not conducive to non-labor intensive manufacturing processes such as injection molding for example.

Although various plastic bird repellant devices are known such as those described in U.S. Pat. No. 7,243,465 to Donoho, U.S. Pat. Appl. No. 2003/0208967 to Riddell, U.S. Pat. No. 6,546,676 to Wiesener et al. and WIPO Publ. No. 2005/029955 to Knight (publ. April 2005), such device suffer from one or more disadvantages including, for example, a higher cost of shipment due to their inability to stack and weight of the plastic.

Thus, there is still a need for a bird repellent device which is easy and less costly to manufacture and ship, and which is relatively inexpensive to the user.

SUMMARY OF THE INVENTION

The inventive subject matter provides apparatus, systems and methods for deterrent devices for birds and other animals. Preferred devices include an elongated base having a base width and at least one glue space. The base can advantageously include first and second support arms or wings coupled to the base and configured to maintain an upright position of the device while reducing the required base width. It is especially preferred that the support arms each has a width that is at least twice the base width, and more preferably, at least three times the base width.

First and second spikes each of which has first and second portions can be coupled to the base. Preferably, the spikes are configured to extend from the base such that the upper portions alternate on each side of the base between a lower-angled spike and an upper-angled spike. In this manner, the alternating spikes maximize the span of the spikes across the base such that the number of spikes on the base can be reduced. As used herein, the term "span" is defined as the maximum width of the device as measured from a distal end of the first spike's first portion and a distal end of the second spike's second portion.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including reducing the use of plastic while enabling the deterrent device to maintain an upright position when subject to forces from birds or other animals or wind or other elements. The reduced amount of plastic needed for the device advantageously reduces the total weight of the device, which reduces its shipment cost. In addition, the device is configured to permit stacking of multiple devices, which further reduces the cost of shipment.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
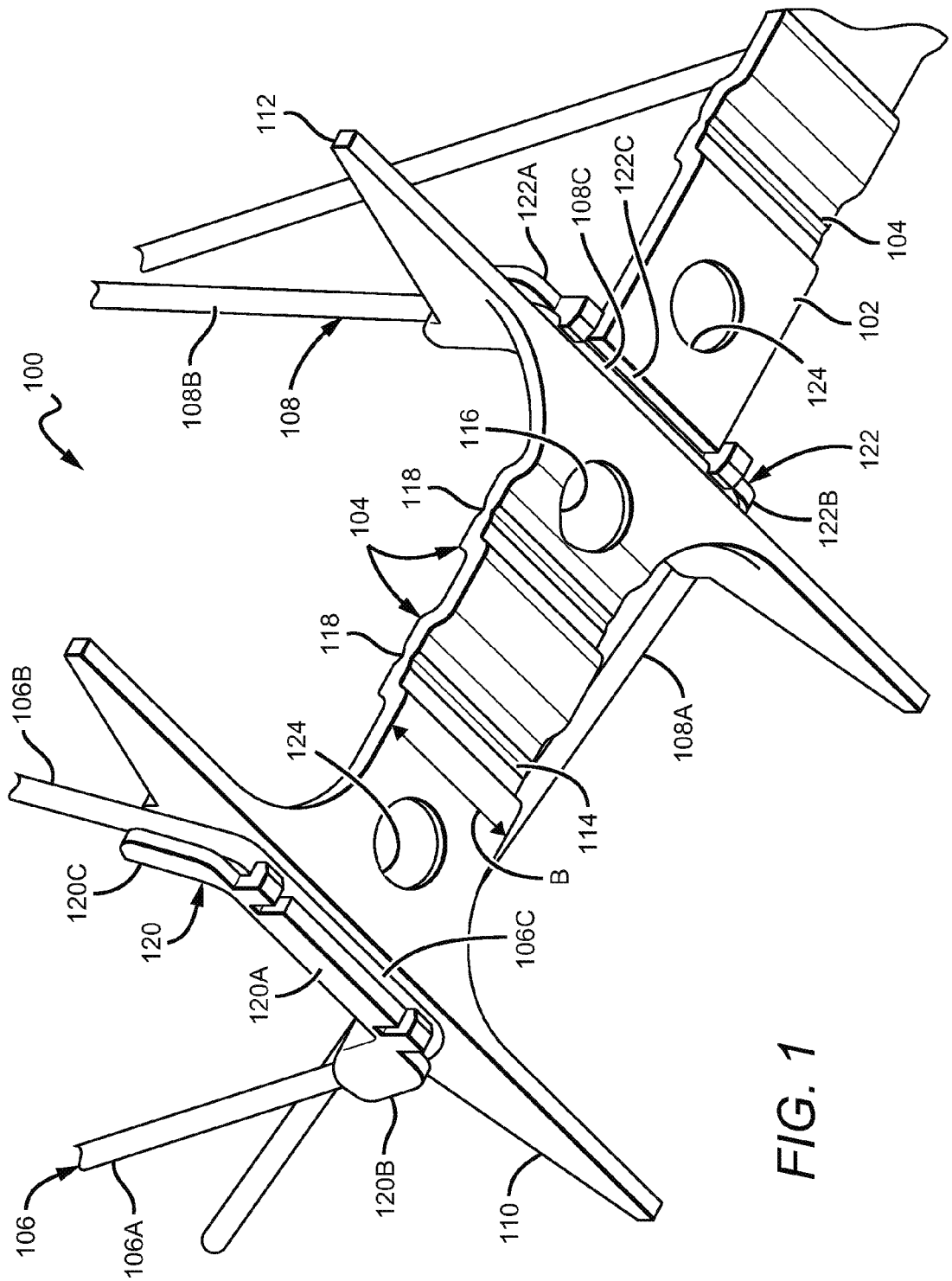
FIG. 1 is a bottom perspective view of one embodiment of a deterrent device.

In FIG. 1, an embodiment of a deterrent device 100 is shown having an elongated base 102 that has a base width "B" and at least one raised portion 104 and preferably at least two raised portions 104 that transversely extends across at least part of base 102. In some contemplated embodiments, the raised portion(s) 104 can comprise glue spaces. In such embodiments, the transverse glue spaces or channels advantageously allow the base 102 to be narrower as compared with deterrent devices of the prior art having longitudinally-extending glue channels. Preferred raised portions 104 have a width that is equal to the base width B, and a length that is at least 1.5 times, and preferably 2 times, the base width B. Alternatively, however, the at least one raised portion 104 can have a width that is less than the base width B.

The device 100 is preferably manufactured in 300 or 600 mm segments, although any commercially suitable length could be used. In an exemplary embodiment, the base 102 could have a base width B of approximately 10 mm and a length of approximately between 200-250 mm.

First and second wings 110 and 112 can be coupled to, and configured to extend laterally from, the base 102, which advantageously allows for a reduced base width B while preventing the base 102 from rocking side to side and thereby maintaining the horizontal stability of the base 102. Preferably, each of the first and second wings 110 and 112 has a width that is at least twice the base width B, and more preferably, at least three times the base width B. It is especially preferred that the wings 110 and 112 each has a width that is at least five times the base width, which significantly reduces the amount of material required to form the base 102 and thereby reduces the weight and shipping cost of the device 100. With the addition of the wings 110 and 112, it has been found that the base width B can be reduced to 15 mm or less, and preferably 10 mm or less, which to Applicant's knowledge was not achievable with prior art devices.

Device 100 can further include first and second spikes 106 and 108 coupled to the base 102. The spikes 106 and 108 are preferably composed of stainless steel, although any commercially suitable material(s) could be used including, for example, other metals or metal composites, plastics or other polycarbonates, and any combinations thereof. In preferred embodiments, the spikes 106 and 108 can be configured to extend from the base 102 such that the spikes 106 and 108 alternate on each side of the base 102 between a lower-angled spike and an upper-angled spike. In addition, adjacent spikes 106 and 108 can be coupled to the base 102 such that a first upper portion 106A of spike 106 extends from the base 102 at an angle that is equal to the angle at which a second upper portion 108B of spike 108 extends from the base 102. In this manner, the span of the spikes 106 and 108 (e.g., the maximum horizontal distance between the spikes 106 and 108) can be increased without increasing the total number of spikes.

In preferred embodiments, the span of the spikes 106 and 108 is at least five times the base width B, more preferably at least eight times, and most preferably, at least ten times the base width B. By increasing the span of the spikes 106 and 108, the device 100 can be utilized to prevent different sizes of birds or other pests from perching on a surface, while reducing the necessary base width B.

As the span of the spikes 106 and 108 is increased, the base width B must generally also be increased to maintain a horizontal stability of the device 100 under forces acting upon the device 100 such as birds or other pests, or wind or other elements. However, by providing wings 110 and 112, the effective width of the base 102 can be increased three fold, four fold, or even five fold or more to accommodate a larger span without or with only a minimal increase in base width B. For example, the spikes 106 and 108 could have a span of approximately 115 mm while the base 102 could have a base width B of approximately 10 mm, which significantly reduces the amount of material required for the base 102 while increasing the stability of the device 100.

As shown in FIG. 1, the first spike 106 can have first and second upper portions 106A-106B and a middle portion 106C coupling the upper portions 106A-106B. Similarly, the second spikes 108 can also include first and second upper portions 108A-108B and a middle portion 108C coupling the upper portions 108A-108B.

The device 100 can further include first and second spike stabilizers 120 and 122 that are each coupled to the base 102 and configured to prevent rotation and maintain an upright position of the first and second spikes 106 and 108, respectively. The spike stabilizers 120 and 122 can include indented portions into which the first and second spikes 106 and 108 can be respectively positioned. Preferably, the first and second spikes 106 and 108 are press or snap fitted into the indented potions of the spike stabilizers 120 and 122, respectively. The device's unique locking mechanism requires only a small amount of plastic or other material while strongly securing the spikes. In addition, the spike stabilizers 120 and 122 advantageously allow for quick machine insertion of the spikes 106 and 108. It is further contemplated that the spikes 106 and 108 could be secured to the base 102 by heat staking one or more protruding studs and thereby cover at least a portion of middle portions 106C and 108C of spikes 106 an 10, respectively.

Preferably, each of the first and second spike stabilizers 120 and 122 has a generally U shape comprising a middle, generally horizontal portion 120A and 122A, and two upwardly extending portions 120B-C and 122B-C, respectively. It is especially preferred that the upwardly extending portions 120B-C and 122B-C each has a length that is no more than 20%, more preferably no more than 15%, and most preferably no more than 10%, of a length of an upper portion of spike 106 or 108. For example, in some contemplated embodiments, first and second upper portions 106A-106B of the first spike 106 could each have a length of approximately 115 mm and the first spike stabilizer 120 could have upwardly-extending portions 120B-C each having a length of approximately 10 mm.

In some contemplated embodiments, the first spike 106 can be disposed between the first wing 110 and the first spike stabilizer 120, and the second spike 108 can be disposed between the second wing 112 and the second spike stabilizer 122.

In some contemplated embodiments, the base 102 can include one or more holes 116 that extend from an upper surface of the base 102 to raised portion 104. The holes advantageously allow for glue or other adhesive to be quickly inserted in the raised portion 104 while the device 100 is adjacent to a mounting surface. Alternatively, the holes 116 could allow for the insertion of a nail or other commercially suitable fastener(s) such that the device 100 can be secured to a mounting surface.

It is further contemplated that the base 102 can have glue spaces 118, which can be at least partially defined by raised portion 104. In this manner, the overall depth of the base 102 can be maintained while providing for the glue spaces 118. In addition, the raised portions 104 can advantageously increase the strength and flexibility of the base 102, allowing the base 102 to be flexed into a U-shape without permanent deformation of the base 102. In such embodiments, one or more of the raised portions 104 can at least partially include a hole 116. The raised portions 104 can advantageously be further configured to accommodate the spikes of another device when the other device is nested within device and while the spikes of each device are oriented at least 5° with respect to a surface normal of the respective base. In this manner, the devices can be closely stacked, which reduces the shipment costs of the devices.

It is contemplated that a collective surface area of the raised portions 104 can be at least half of the total surface area of the base 102, which advantageously increases the strength of the base 102 against torque and other forces without a need to increase the base width B.

The base 102 can further include a plurality of apertures 124, which can be configured to receive a nail or other fastener to thereby attach the device 100 to a mounting surface.

Optionally, the base 102 can include one or more transverse break points 114, which allow for quick resizing of the base 102 without the need for additional tools. In some contemplated embodiments, at least one of the raised portions 104 can include a break point 114, which comprises a recessed area of at least one raised portion 104.

The base 102, wings 110 and 112, and spike stabilizers 120 and 122 can preferably be extruded using recycled polycarbonate, which advantageously reduces the manufacturing cost and weight of the device 100 while reducing its environmental impact. However, the various components could alternatively be injection-molded or formed via any commercially suitable process. It is further contemplated that the base 102 and other components could comprise non-recycled polycarbonate, metals or metal composites, or any other commercially suitable material(s) or combinations thereof.

Optionally, base 102 could include a V-shape vertical cross-section, which allows the device 100 to bend laterally.

Figure 2A:
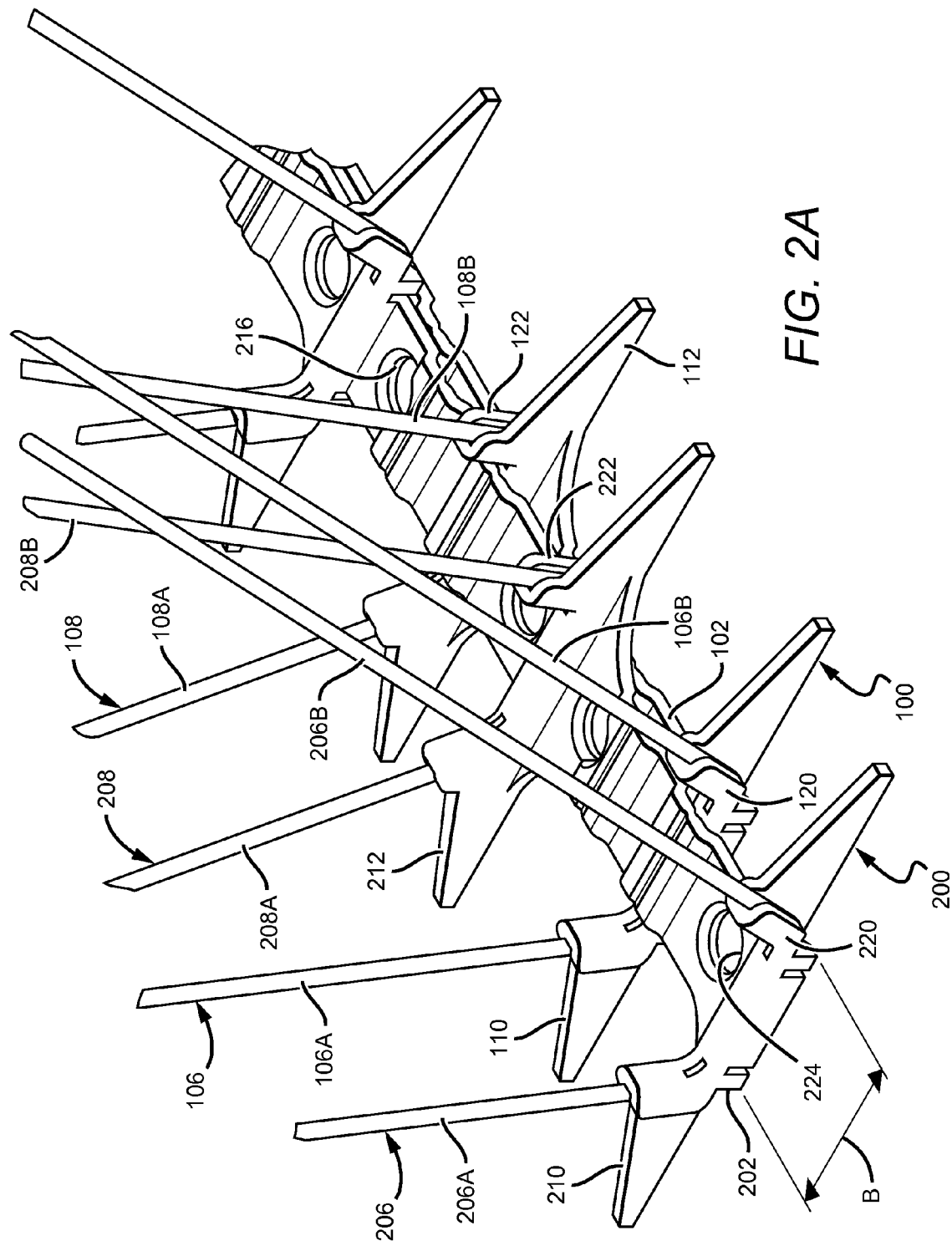
FIGS. 2A-2B are perspective and side views of one embodiment of a deterrent device nested within another deterrent device.
Figure 2B:
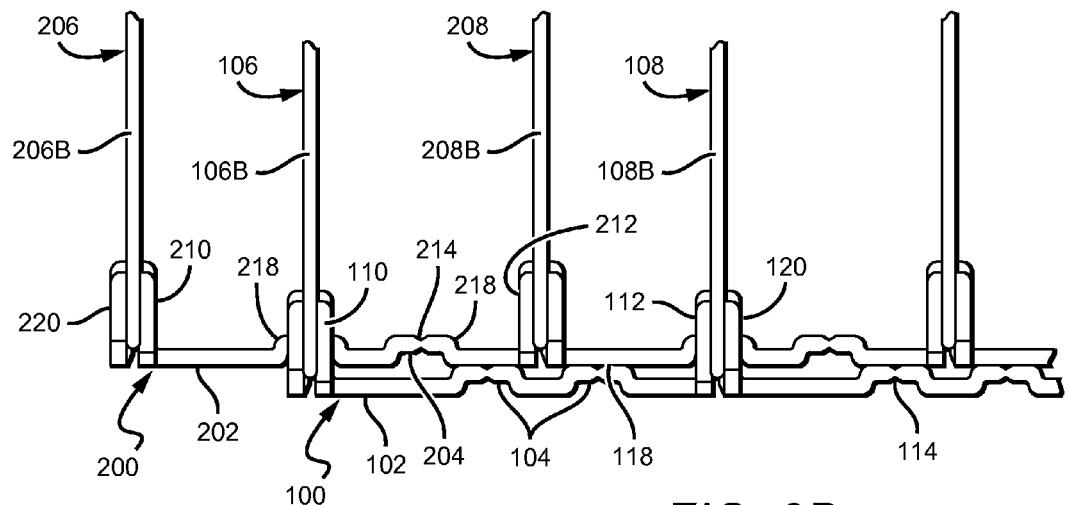

FIGS. 2A-2B illustrate device 100 of FIG. 1 nested within a second deterrent device 200. The raised portions 104 can advantageously allow the device 100 to accommodate the spikes 206 and 208 of the second device 200 when the device 100 is nested within the second device 200 and while the spikes 206 and 208 are oriented at least 5° with respect to a surface normal of base 202. In this manner, the vertical spacing between neighboring devices 100 and 200 can be substantially reduced to preferably less than 3 cm, more preferably less than 1 cm, and most preferably allows for little or no spacing between the devices 100 and 200, which thereby increases the number of devices that can be stacked within a given height. This advantageously can reduce the amount of packaging and therefore the shipment cost of the devices. With respect to the remaining numerals in each of FIGS. 2A-2B, the same considerations for like components with like numerals of FIG. 1 apply.

Figure 3:
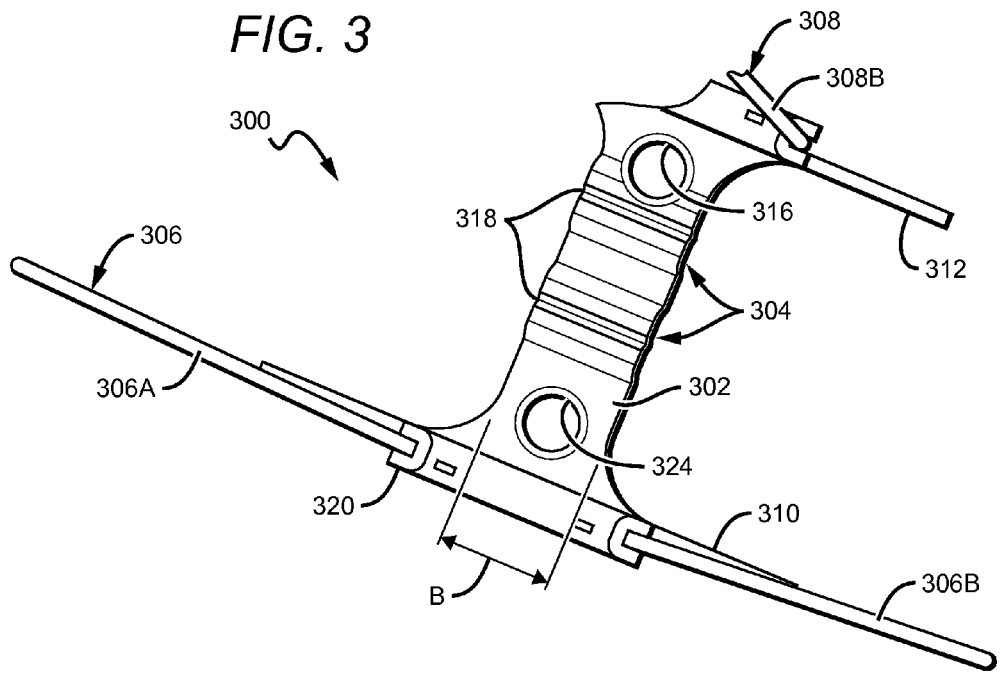
FIG. 3 is a top view of another embodiment of a deterrent device.

In FIG. 3, a top view of another embodiment of a deterrent device 300 is shown. With respect to the remaining numerals in FIG. 3, the same considerations for like components with like numerals of FIG. 1 apply.

Figure 4A:
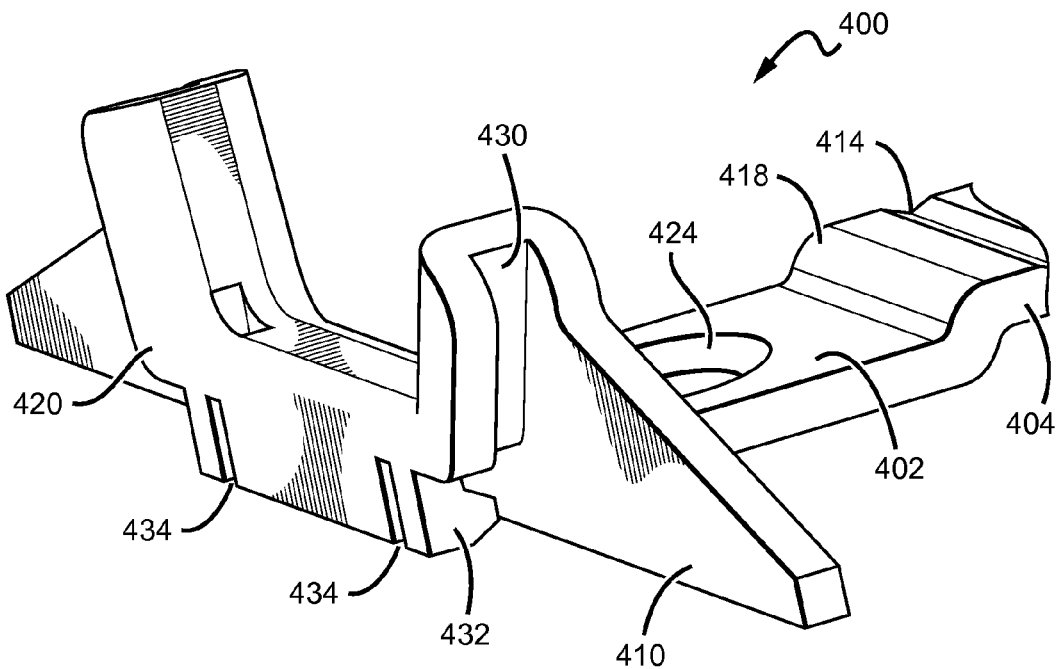
FIGS. 4A-4B are enlarged views of another embodiment of a deterrent device.
Figure 4B:
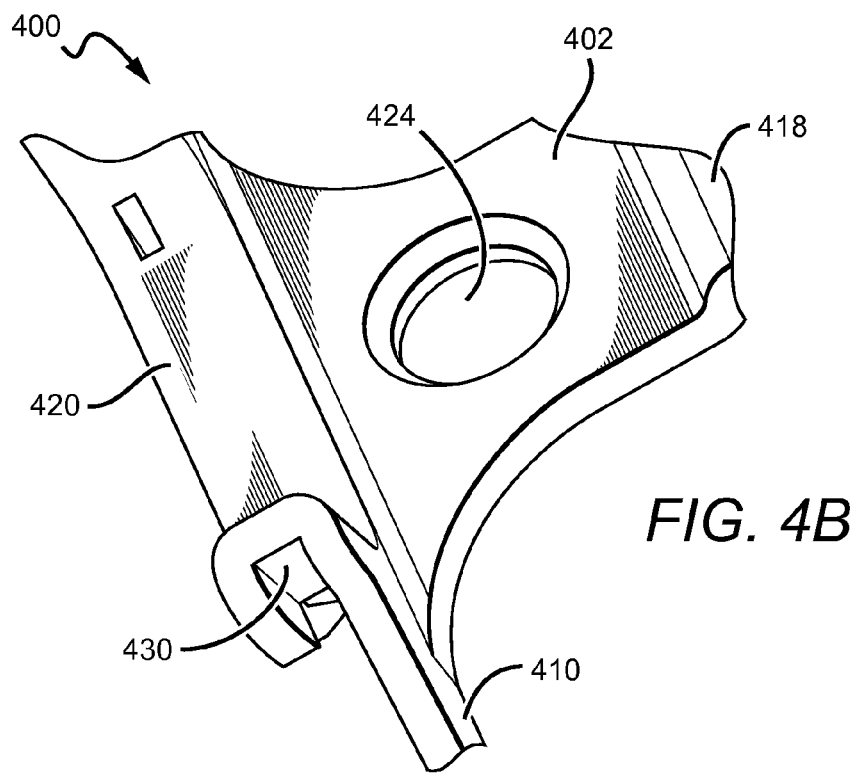

FIGS. 4A-4B illustrate enlarged perspective and top views of a first spike stabilizer 420, respectively, which can include an indented or recessed portion 430 into which a first spike can be inserted. Preferably, the first spike stabilizer 420 includes one or more teeth 432 configured to have sufficient flexibility to allow the first spike to be snap or press fit into the recessed portion 430. To provide the teeth 432 with sufficient flexibility, the first spike stabilizer 420 can include one or more gaps 434 that partially separate the teeth 432 from the first spike stabilizer 420. Using the teeth 432 as locking mechanisms, the spikes can be quickly and easily coupled to the base 102 by a machine or less preferably by hand. With respect to the remaining numerals in each of FIGS. 4A-4B, the same considerations for like components with like numerals of FIG. 1 apply.

Figure 5A:
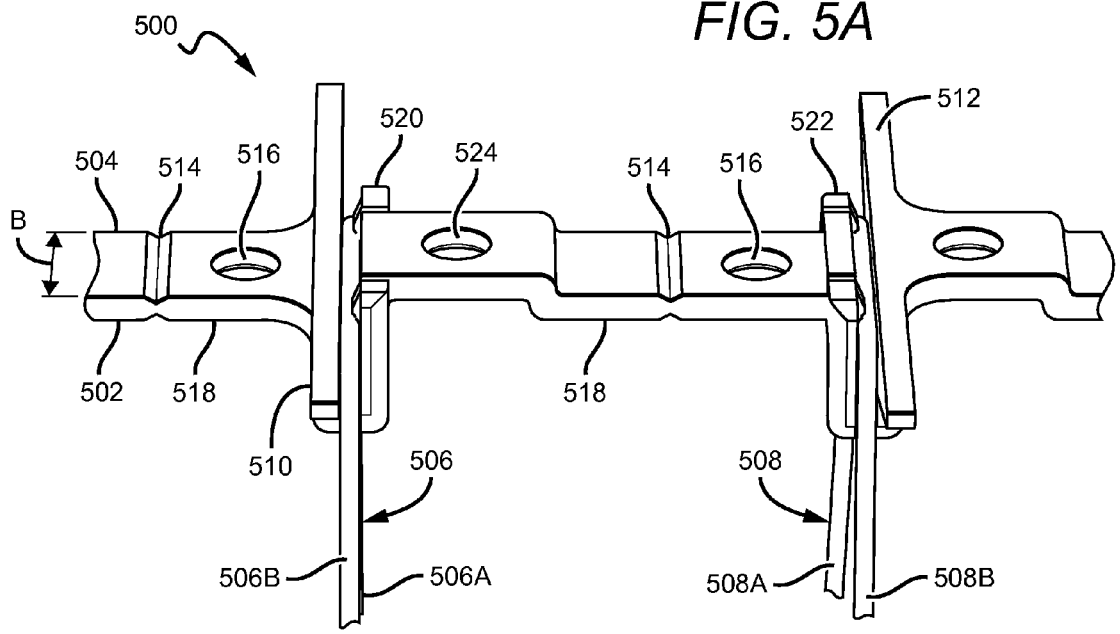
FIGS. 5A-5B are bottom perspective views of yet another embodiment of a deterrent device.
Figure 5B:
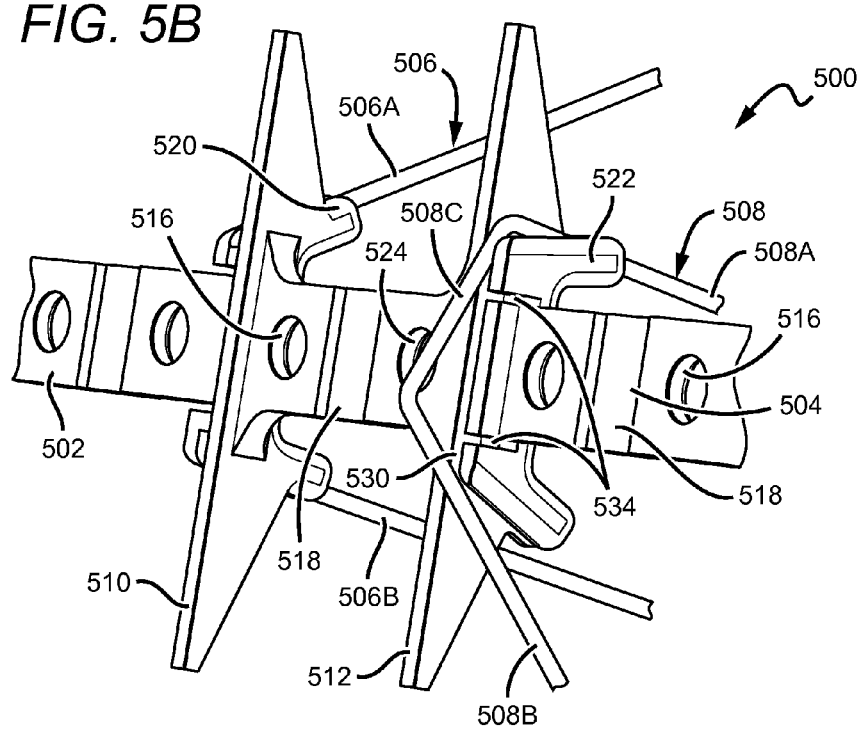

In FIGS. 5A-5B, another embodiment of a deterrent device 500 is shown having a raised portion 504 disposed between adjacent first and second spikes 506 and 508. In such embodiments, it is contemplated that the raised portion 504 could have a length that is at least 1.5 times the base width B, and preferably, at least two times the base width B. In an exemplary embodiment, the base 102 could have a base width of approximately 10 mm, and the raised portion 504 could have a width of approximately 10 mm and a length of approximately 20 mm, which advantageously allows for nesting of device 500 within other deterrent devices, while also providing for a large surface area for glue or other adhesive to adhere the base 502 to a desired surface.

Spike stabilizers 520 and 522 can each have a recessed area 530 into which the first and second spikes 506 and 508 can be inserted, respectively. In this manner, the first spike 506 can be prevented from rotating and thereby maintain an upright position because of the spike stabilizer 520 and wing 510 on opposite sides of the first spike 506 and the mounting surface below. Similarly, the second spike 508 can be prevented from rotating because of the spike stabilizer 522 and wing 512 on opposite sides of the second spike 508 and the mounting surface below.

The spike stabilizers 520 and 522 can further include gaps 532, which allow teeth 534 to have sufficient flexibility to allow the first and second spikes 506 and 508 to be snap or press-fitted into the recessed area 530 of the first and second spike stabilizers 520 and 522, respectively. With respect to the remaining numerals in each of FIGS. 5A-5B, the same considerations for like components with like numerals of FIG. 1 apply.

Figure 6A:
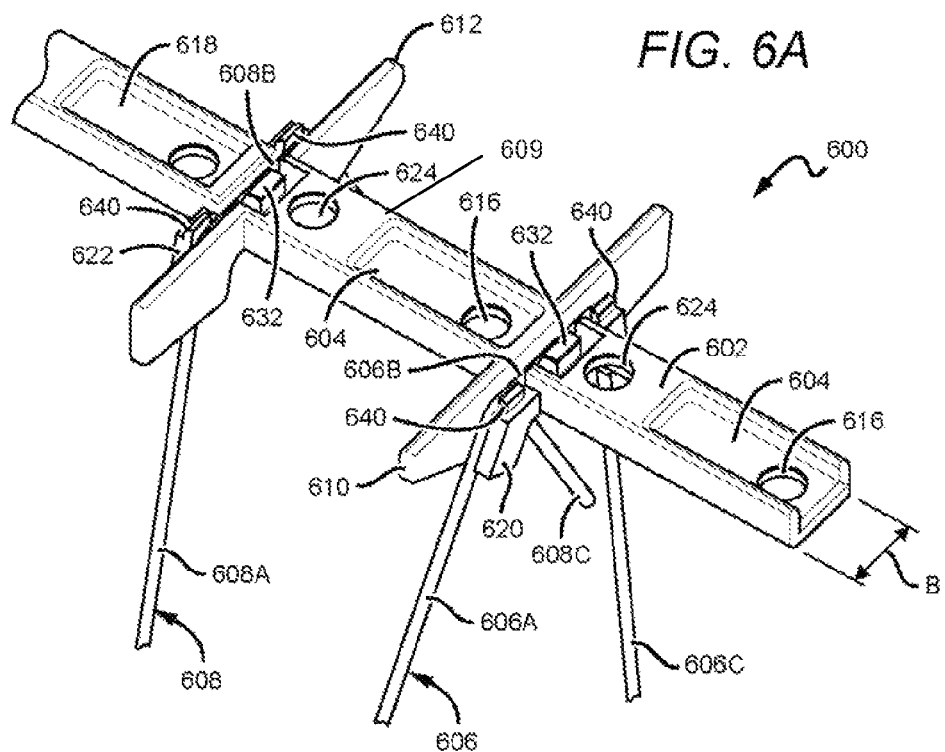
FIGS. 6A-6C are a bottom perspective view, a vertical cross-section view, and a top view, respectively, of another embodiment of a deterrent device.
Figure 6B:
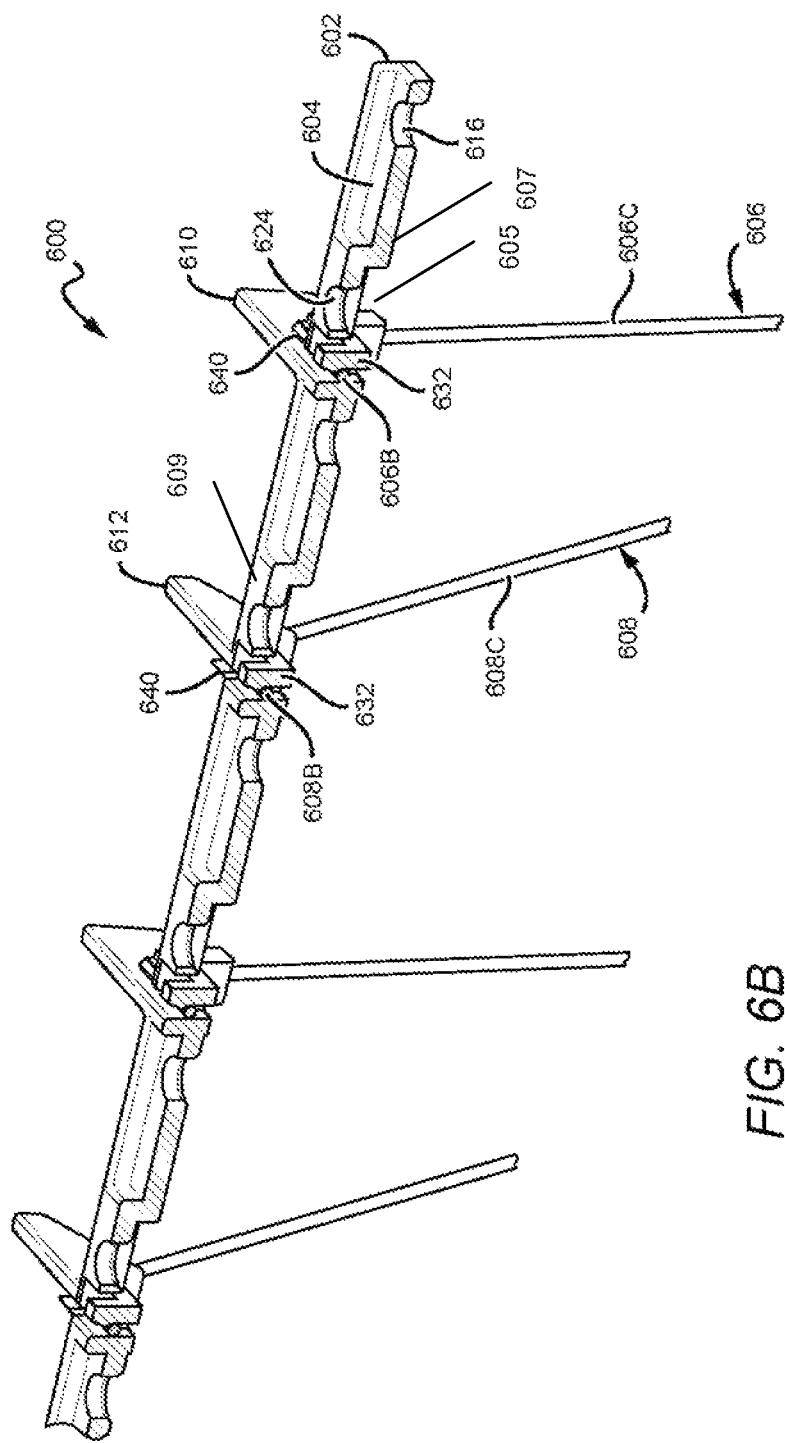
Figure 6C:
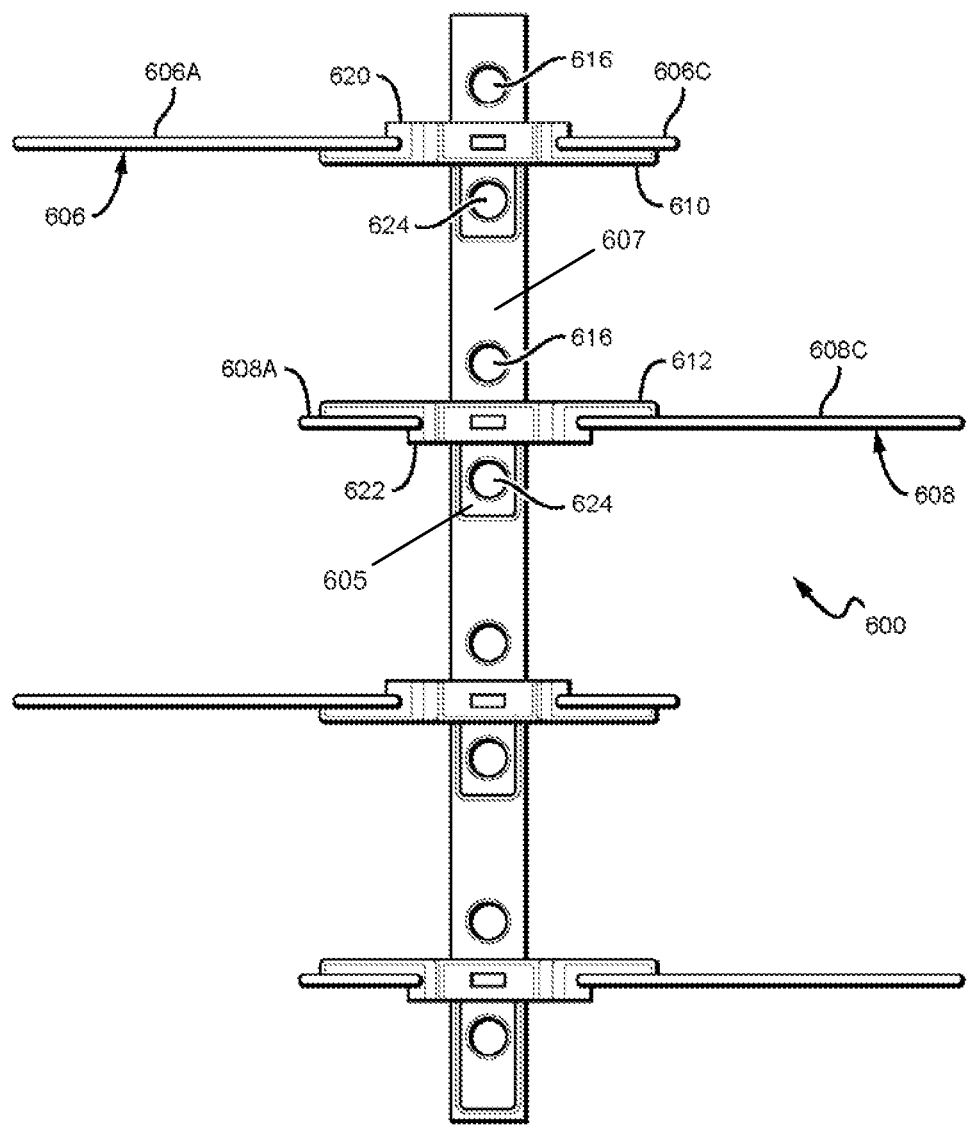

FIGS. 6A-6C illustrate another embodiment of a deterrent device 600 for birds or other pests having a base 602 to which a plurality of spikes can be coupled, the base having upper and lower surfaces 607 and 609, respectively, with an upper recessed area 605 extending from the upper surface 607 and a lower recessed area 604 extending from the lower surface 609. A first spike 606 can be positioned within an indented or recessed portion between a first wing 610 and a first spike stabilizer 620, which thereby maintains the spike 606 in a generally vertical, upright position with respect to base 102. Optionally, the first spike 606 can be press fit or snap fit using tab 632 into a gap between the first wing 610 and a first spike stabilizer 620. However, it is especially preferred that the first spike 606 is secured to the base 602 by heat staking at least one protruding stud 640 to thereby deform the stud 640 and cover at least a portion of the first spike 606. This heat staking process preferably occurs during manufacture of the device 600. In this manner, the deformed stud 640 prevents the spike from being accidentally dislodged from the base 602. Although shown coupled to the first spike stabilizer 620, it is contemplated that the at least one stud 640 could be coupled to the first wing 610, or other portion of the device 100 such that the stud 640 when deformed can cover at least a portion of a spike. With respect to the remaining numerals in each of FIGS. 6A-6C, the same considerations for like components with like numerals of FIG. 1 apply.

Figure 7:
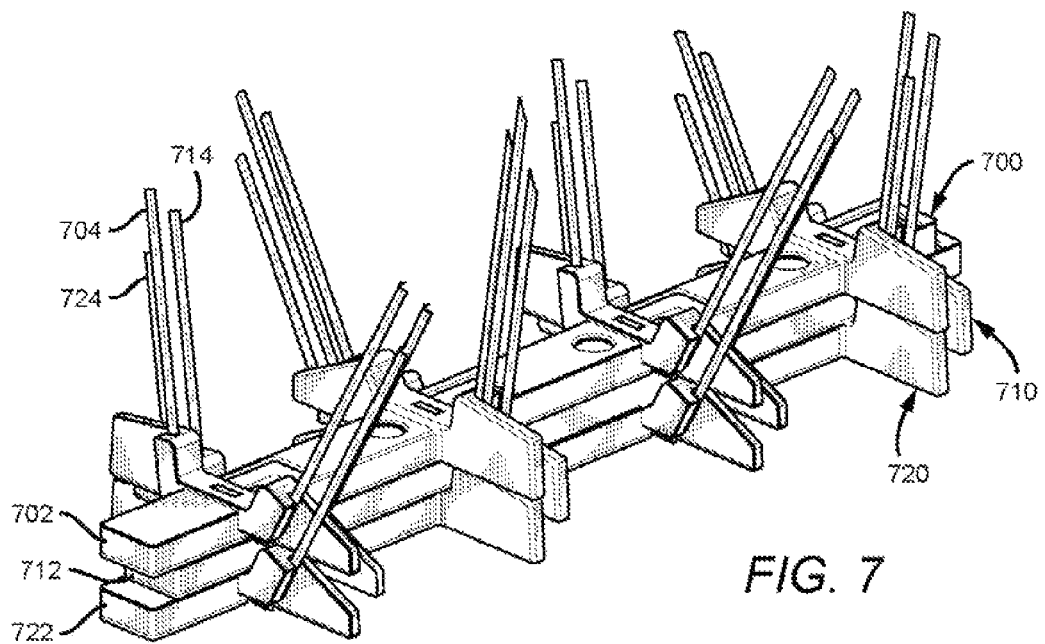
FIG. 7 is a side perspective view of a plurality of nested deterrent devices.

FIG. 7 illustrates a side perspective view of a plurality of deterrent devices 700, 710, and 720, which are nested within an adjacent deterrent device. The deterrent devices 700, 710, and 720 can each include a plurality of spikes 704, 714, and 724 that project upwardly and outwardly from the bases 702, 712 and 722 of each of the deterrent devices 700, 710, and 720, respectively. In this manner, the vertical spacing between neighboring devices 700 and 710 and 710 and 720 can be substantially reduced to preferably less than 3 cm, more preferably less than 1 cm, and most preferably allows for little or no spacing between adjacent devices, which thereby increases the number of devices that can be stacked within a given height while the spikes 704, 714, and 724 of the devices 700, 710 and 720, respectively, are oriented at least 5° with respect to a surface normal of bases 702, 712 and 722.

This advantageously can reduce the amount of packaging and therefore the shipment cost of the devices.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A deterrent device, comprising:
   an elongated base having upper and lower surfaces and a base width, the base further comprises an upper recessed area extending from the upper surface and a lower recessed area extending from the lower surface, wherein each of the recessed areas has a width that is less than the base width; and
   a plurality of spikes coupled to, and extending outwardly from, the elongated base.

2. The device of claim 1, wherein the plurality of spikes are disposed with respect to the elongated base such that the spikes alternate on each side of the elongated base between a lower-angled spike and an upper-angled spike.

3. The device of claim 1, wherein the upper and lower recessed areas alternate sequentially between an upper recessed area and a lower recessed area along a length of the elongated base.

4. The device of claim 1, wherein the upper recessed area comprises an aperture that extends from the upper surface of the base to the recessed area.

5. The device of claim 1, wherein the plurality of spikes are composed of stainless steel.

6. The device of claim 1, wherein the plurality of spikes are composed of plastic.

7. The device of claim 1, wherein the elongated base and the plurality of spikes are injection molded.

8. The device of claim 1, wherein the elongated base further comprises first and second wings, each of which has a width that is at least twice the base width.

9. The device of claim 1, wherein the deterrent device is nestable within a second elongated base of a second deterrent device, and wherein the second deterrent device has a second plurality of spikes oriented at least 5° with respect to a surface normal of the second elongated base, and wherein the elongated base is less than 3 cm from the second elongated base when the deterrent device is nested within the second deterrent device.

10. The device of claim 1, wherein a collective surface area of the upper and lower recessed areas is greater than 50% of a total surface area of the elongated base.

11. The device of claim 1, wherein the base width is no more than 10 mm.

12. A deterrent device, comprising:
    an elongated base having upper and lower raised portions that alternate sequentially along a length of the base between an upper raised portion and a lower raised portion;
    a plurality of spikes comprising pairs of spikes disposed along a length of the base, the spikes each coupled to, and extending outwardly from, the elongated base;
    wherein at least one of the upper raised portions and at least one of the lower raised portion are disposed along the length of the base between an adjacent pair of spikes; and
    wherein the deterrent device is nestable within a second elongated base of a second deterrent device, and wherein the second deterrent device has a second plurality of spikes oriented at least 5° with respect to a surface normal of the second elongated base, and wherein the elongated base is less than 3 cm from the second elongated base when the deterrent device is nested within the second deterrent device.

13. The device of claim 12, wherein the elongated base and the plurality of spikes comprise a single injection molded piece of plastic.

14. The device of claim 12, wherein each of the upper and lower raised portions has a width that is less than a width of the elongated base.

15. The device of claim 12, wherein the plurality of spikes are disposed with respect to the elongated base such that the spikes alternate on each side of the elongated base between a lower-angled spike and an upper-angled spike.

16. The device of claim 12, wherein each of the upper and lower raised portions comprises an aperture.

17. The device of claim 12, wherein a collective surface area of the upper and lower raised portions is greater than 50% of a total surface area of the elongated base.

18. The device of claim 12, wherein the elongated base has a width of no more than 10 mm.

19. A deterrent device, comprising:
    an elongated base having upper and lower surfaces and comprising a plurality of upper and lower raised portions comprising a first upper recessed area extending from the upper surface and a first lower recessed area extending from the lower surface, wherein the plurality of upper and lower raised portions alternate sequentially along a length of the base between an upper raised portion and a lower raised portion;
    a plurality of spikes comprising first and second pairs of spikes disposed along a length of the base, the plurality of spikes each coupled to, and extending outwardly from, the elongated base; and
    wherein the elongated base includes the first upper recessed area and the first lower recessed area disposed along the length of the base between the first pair of spikes and the second pair of spikes.

* * * * *